(12) United States Patent
Cho et al.

(10) Patent No.: US 8,451,393 B2
(45) Date of Patent: May 28, 2013

(54) LIQUID CRYSTAL DISPLAY

(75) Inventors: Seon-Ah Cho, Busan (KR); Jang-Kun Song, Seoul (KR); Hyun-Wuk Kim, Asan-si (KR); Eun-Je Jang, Asan-si (KR); You-Sik Shin, Asan-si (KR)

(73) Assignee: Samsung Display Co., Ltd., Yongin-City, Gyeonggi-Do (KR)

( * ) Notice: Subject to any disclaimer, the term of this patent is extended or adjusted under 35 U.S.C. 154(b) by 343 days.

(21) Appl. No.: 12/832,483

(22) Filed: Jul. 8, 2010

(65) Prior Publication Data
US 2011/0096260 A1 Apr. 28, 2011

(30) Foreign Application Priority Data
Oct. 28, 2009 (KR) .................. 10-2009-0102978

(51) Int. Cl.
*G02F 1/1343* (2006.01)
*G02F 1/136* (2006.01)
*G02F 1/1337* (2006.01)

(52) U.S. Cl.
USPC ................................ 349/38; 349/41; 349/129

(58) Field of Classification Search
USPC ................................. 349/38–43, 129, 139, 143
See application file for complete search history.

(56) References Cited

U.S. PATENT DOCUMENTS

| 7,345,717 | B2 | 3/2008 | Lai |
| 7,359,025 | B2 | 4/2008 | Wu et al. |
| 7,944,515 | B2 * | 5/2011 | Song ........................... 349/129 |
| 8,199,266 | B2 * | 6/2012 | Su et al. ........................ 349/39 |
| 2010/0328564 | A1 * | 12/2010 | Jeong et al. .................... 349/39 |

FOREIGN PATENT DOCUMENTS

| JP | 07-146488 | 6/1995 |
| JP | 2000-098420 | 4/2000 |
| JP | 2001-209070 | 8/2001 |
| JP | 2001-264818 | 9/2001 |
| JP | 2003-091017 | 3/2003 |
| JP | 2007-199422 | 8/2007 |
| KR | 1019940004322 | 5/1994 |
| KR | 100163933 B1 | 9/1998 |
| KR | 100370800 B1 | 12/2001 |
| KR | 100643559 B1 | 6/2002 |
| KR | 100848108 B1 | 9/2002 |
| KR | 100522024 B1 | 7/2004 |
| KR | 1020070037013 | 4/2007 |
| KR | 1020080001106 | 1/2008 |

* cited by examiner

Primary Examiner — Dung T. Nguyen
(74) Attorney, Agent, or Firm — F. Chau & Associates, LLC

(57) ABSTRACT

A liquid crystal display includes: a plurality of signal lines disposed on a substrate, a pixel electrode connected to the plurality of signal lines and including a first subpixel electrode and a second subpixel electrode, a common electrode facing the pixel electrode, a liquid crystal layer disposed between the pixel electrode and the common electrode and a step-up capacitor connected between an output terminal of a switching element connected to the second subpixel electrode and the first subpixel electrode. The step-up capacitor is formed by overlapping a first conductor connected to the output terminal of the switching element and a second conductor connected to the first subpixel electrode via an insulating layer, and the second conductor has a cutout at an edge opposite the output terminal of the switching element.

20 Claims, 8 Drawing Sheets

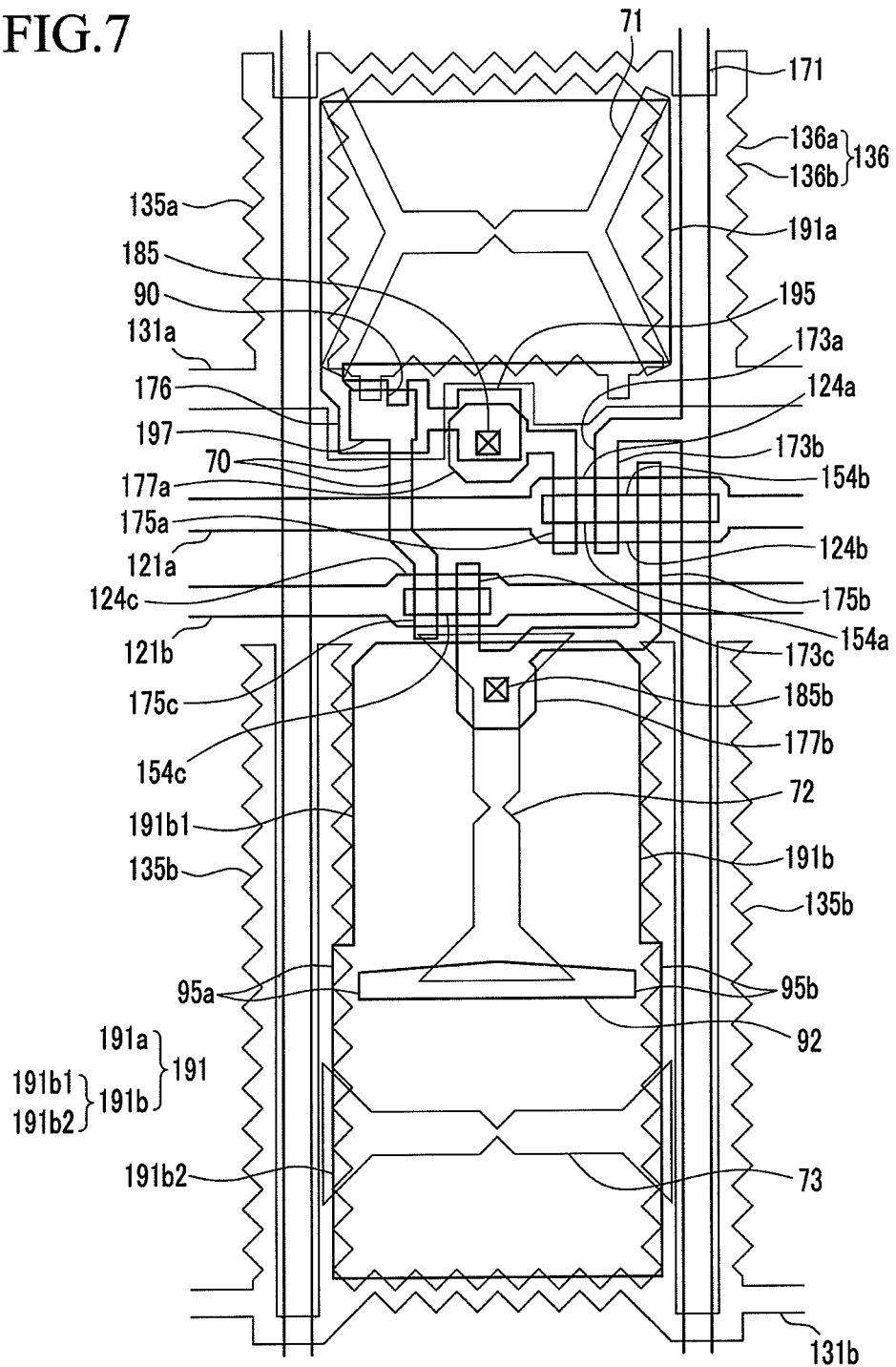

LIQUID CRYSTAL DISPLAY

CROSS-REFERENCE TO RELATED APPLICATION

This application claims priority to Korean Patent Application No. 10-2009-0102978 filed on Oct. 28, 2009, the entire disclosure of which is hereby incorporated herein by reference herein in it's entirety.

BACKGROUND OF THE INVENTION (a) Technical Field

The present disclosure relates to a liquid crystal display.

(b) Description of the Related Art

Liquid crystal displays are now widely used as one type of flat panel display. A liquid crystal display may have two display panels on which field generating electrodes such as pixel electrodes and a common electrode are formed, and a liquid crystal layer that is interposed between the panels. Voltages may be applied to the field generating electrodes so as to generate an electric field over the liquid crystal layer, and the alignment of liquid crystal molecules of the liquid crystal layer may be determined by the electric field. Accordingly, the polarization of incident light may be controlled, thereby performing image display.

The liquid crystal display further may have thin film transistors connected to pixel electrodes, respectively, and a plurality of signals lines such as gate lines and data lines for controlling them.

Among the LCDs, a vertical alignment (VA) mode LCD, which aligns LC molecules such that their long axes are perpendicular to the panels in the absence of an electric field, is spotlighted because of its high contrast ratio and wide reference viewing angle. Here, the reference viewing angle implies a viewing angle that is about 1:10 in contrast ratio, or a critical angle of gray-to-gray luminance reversion.

In the vertical alignment (VA) mode liquid crystal display, as a method of achieving a wide viewing angle, there is a method of forming a cutout in a field generating electrode, and a method of forming a protrusion above or below the field generating electrode. The directions in which the liquid crystal molecules are inclined can be determined by the cutouts and the protrusions such that the directions may be varied by appropriately arranging the cutouts and the protrusions to increase the reference viewing angle.

Also, the VA mode LCD may have certain difficulties associated therewith such as side visibility being inferior to front visibility. To correct the above-mentioned difficulties to make the lateral visibility close to the front visibility, a method in which one pixel is divided into two sub-pixels and the two sub-pixels are applied with different voltages to obtain different transmittance has been proposed.

As the method to apply two sub-pixels with different voltages, a method in which a step-up capacitor is used to change the voltages of two subpixels has been proposed, and here, if the capacitance of the step-up capacitor per each pixel is not uniform, display deteriorations such as texture may be generated. For example, the capacitance magnitude of the step-up capacitor for each pixel may be changed according to the misalignment of two conductors of the step-up capacitor.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention may enhance side visibility without display deteriorations such as texture by uniformly maintaining a difference between the voltages of two subpixels per pixel using a capacitor.

A liquid crystal display according to an exemplary embodiment of the present invention includes: a plurality of signal lines disposed on a substrate, a pixel electrode connected to the plurality of signal lines and including a first subpixel electrode and a second subpixel electrode, a common electrode facing the pixel electrode, a liquid crystal layer disposed between the pixel electrode and the common electrode and a step-up capacitor connected between an output terminal of a switching element connected to the second subpixel electrode and the first subpixel electrode. The step-up capacitor is formed by overlapping a first conductor connected to the output terminal of the switching element and a second conductor connected to the first subpixel electrode via an insulating layer, and the second conductor has a cutout at an edge opposite the output terminal of the switching element.

The width of the cutout of the second conductor may be the same as a width of a connection between the first conductor and the output terminal of the switching element.

The length of the cutout of the second conductor may be the same as a difference between the length of the first conductor and the length of the second conductor with respect to the length direction of the second conductor.

The common electrode may have a domain division means.

The liquid crystal layer may be divided into a first direction domain and a second direction domain in the region occupied by the first subpixel electrode, and a third direction domain and a fourth direction domain in the region occupied by the second subpixel electrode.

The first direction domain may be an up and down domain, the second direction domain may be a left and right domain, the third direction domain may be an up and down domain, and the fourth direction domain may be a left and right domain.

The first subpixel electrode and the second subpixel electrode may be separated from each other, and the switching element connected to the second subpixel electrode may be disposed between the first subpixel electrode and the second subpixel electrode.

The second subpixel electrode may be divided into a first portion and a second portion, and the liquid crystal layer may be divided into a first direction domain in the region occupied by the first portion of the second subpixel electrode and a second direction domain in the region occupied by the second portion of the second subpixel electrode.

A voltage charged between first subpixel electrode and the common electrode may be higher than a voltage charged between the second subpixel electrode and the common electrode.

The liquid crystal display may further include a storage electrode extended according to the edge of the first subpixel electrode and the second subpixel electrode.

Accordingly, a voltage difference between two subpixels may be uniformly maintained for each pixel by using the capacitor such that the side visibility may be improved without the display deterioration such as texture in the vertical alignment liquid crystal display.

In accordance with another exemplary embodiment, a liquid crystal display is provided. The liquid crystal display includes a lower display panel, an upper display panel facing the lower panel and having a common electrode formed thereon and a liquid crystal layer disposed between the upper display panel and the lower display panel. The lower display panel includes a plurality of gate conductors including a first gate line and a second gate line and a first storage electrode line and a second storage electrode line formed on an insulation substrate, wherein the first gate line includes a first gate electrode and a second gate electrode and the second gate line includes a third gate electrode, wherein the first storage electrode line includes a first storage electrode and the second storage electrode line includes a second storage electrode. The lower display panel further includes a gate insulating layer formed on the plurality of gate conductors, a first semiconductor island, a second semiconductor island and a third semiconductor island formed on the gate insulating layer, a plurality of ohnmic contacts formed on the first semiconductor island, the second semiconductor island and the third semiconductor island, a data conductor including a plurality of data lines having a first source electrode, a second source electrode, a first drain electrode, a second drain electrode, a third source electrode and a third drain electrode, wherein the third drain electrodes are formed on the ohmic contacts and the gate insulating layer and includes a first capacitor electrode extended from the third drain electrode. The first gate electrode, the first source electrode, and the first drain electrode form a first thin film transistor along with the first semiconductor island, the second gate electrode, the second source electrode, and the second drain electrode form a second thin film transistor along with the second semiconductor island, the third gate electrode, the third source electrode, and the third drain electrode form a third thin film transistor along with the third semiconductor island. In addition, the lower display panel further includes a passivation layer formed on the plurality of data conductors and on an exposed portion of the first semiconductor island, the second semiconductor island and the third semiconductor island, a pixel electrode including a first subpixel electrode and a second subpixel electrode formed on the passivation layer and wherein the first subpixel electrode includes a second capacitor electrode extending toward the first drain electrode and wherein the first subpixel electrode and the second subpixel electrode are physically and electrically connected to the first drain electrode and the second drain electrode and a step-up capacitor which includes the first capacitor electrode extended from the third drain electrode and the second capacitor electrode extended from the first subpixel electrode overlapping with each other via the passivation layer. The second capacitor electrode has a cutout at an edge facing a connection between the third drain electrode and the first capacitor electrode.

BRIEF DESCRIPTION OF THE DRAWINGS

Exemplary embodiments of the present invention can be understood in more detail from the following description taken in conjunction with the attached drawings in which:

FIG. 7 is a layout view of a liquid crystal display according to an exemplary embodiment of the present invention.

DETAILED DESCRIPTION OF THE EXEMPLARY EMBODIMENTS

Figure 1:
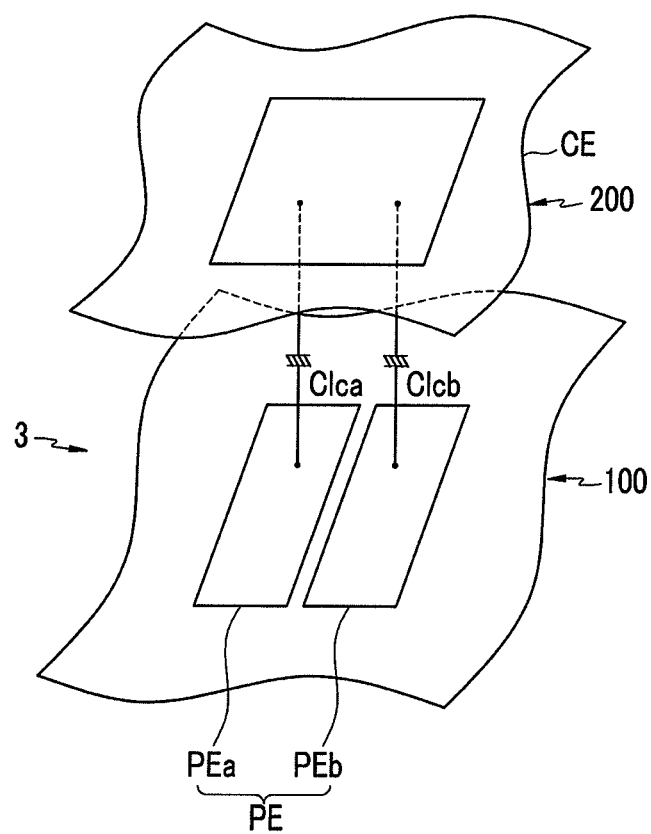
FIG. 1 is a view showing a structure of a liquid crystal display and an equivalent circuit of two subpixels according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
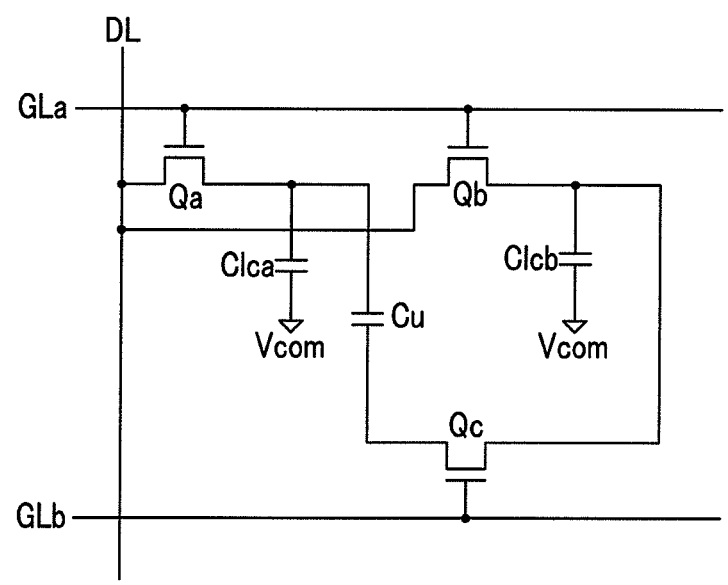
FIG. 2 is an equivalent circuit diagram of a pixel of a liquid crystal display according to an exemplary embodiment of the present invention.

Now, a structure and an operation of a liquid crystal display according to an exemplary embodiment of the present invention will be described with reference to FIG. 1 and FIG. 2. FIG. 1 is a view showing a structure of a liquid crystal display and an equivalent circuit of two subpixels according to an exemplary embodiment of the present invention, and FIG. 2 is an equivalent circuit diagram of a pixel of a liquid crystal display according to an exemplary embodiment of the present invention.

As shown in FIG. 1, a liquid crystal display according to an exemplary embodiment of the present invention includes a lower panel 100 and an upper panel 200 facing each other, and a liquid crystal layer 3 interposed therebetween. The liquid crystal display includes a plurality of signal lines and a plurality of pixel PX connected thereto.

Each pixel PX includes a pair of subpixels, and the subpixels respectively include liquid crystal capacitors Clca and Clcb. The two subpixels include gate lines GLa and GLb, a data line DL, and switching elements Qa, Qb, and Qc connected to the liquid crystal capacitors Clca and Clcb.

The liquid crystal capacitors Clca and Clcb have two terminals of the sub-pixel electrodes PEa and PEb of the lower panel 100 and a common electrode CE of the upper panel 200, and the liquid crystal layer 3 functions as a dielectric material between the sub-pixel electrodes PEa and PEb and the common electrode 270. The pair of sub-pixel electrodes PEa and PEb are separated from each other to form one pixel electrode PE. The common electrode CE is formed at the whole area of the upper panel 200 to receive a common voltage Vcom. The liquid crystal layer 3 has negative dielectric anisotropy, and liquid crystal molecules 31 of the liquid crystal layer 3 may be aligned so that major axes thereof are perpendicular to the surface of the two display panels in the state free of an electric field. Unlike FIG. 2, the common electrode (CE) may be provided on the lower panel 100. In this case, at least one of the two electrodes (PE and CE) may be made in the form of, for example, a line or a bar.

Meanwhile, to realize color display, each pixel PX uniquely displays one of primary colors (spatial division), or each pixel PX temporally and alternately displays primary colors (temporal division). Then, the primary colors are spatially or temporally synthesized, and thus a desired color is recognized. An example of the primary colors may be, for example, three primary colors of red, green, and blue. The liquid crystal display according to an exemplary embodiment of the present invention is one example of the spatial division where each pixel PX is provided with a color filter formed on or under the subpixel electrodes PEa and PEb and indicating one of the primary colors. However, in a liquid crystal display according to another exemplary embodiment of the present invention, the color filter may be formed in a corresponding region of the upper panel 200.

Polarizers for providing light polarization may be provided on outer surfaces of the display panels 100 and 200, and the polarization axis of the two polarizers may be crossed. One of the two polarizers may be omitted in a reflective LCD. In the case of the crossed polarizers, the light incident to the liquid crystal layer 3 may be blocked when an electric field is not applied.

Referring to FIG. 2, one pixel of a liquid crystal display according to the present exemplary embodiment includes the first, and second, and third switching elements Qa, Qb, and Qc, the first and second liquid crystal capacitors Clca and Clcb, and a step-up capacitor Cu.

The first and second switching elements Qa and Qb are respectively connected to the first gate line GLa and the data line DL, and the third switching element Qc is connected to the second gate line GLb.

The first and second switching elements Qa and Qb are three terminal elements such as, for example, thin film transistors provided in the lower panel 100, and they have control terminals connected to the first gate lines GLa, input terminals connected to the data lines DL, an output terminal of the first switching element Qa connected to the first liquid crystal capacitor Clca, and an output terminal of the second switching element Qb connected to the second liquid crystal capacitor Clcb.

The third switching element Qc is also a three terminal element such as, for example, a thin film transistor provided in the lower panel 100, the control terminal of which is connected to one of the second gate lines GLb, the input terminal of which is connected to the second liquid crystal capacitor Clcb, and the output terminal of which is connected to the step-up capacitor Cu.

The step-up capacitor Cstd is connected to the output terminal of the third switching element Qc and the first liquid crystal capacitor Clcb, and is formed by overlapping the output electrode of the third switching element Qc and the first pixel electrode 191a via an insulator therebetween.

Description will be now given with respect to a particular row of pixels, for example the i-th pixel row.

A first gate signal is applied to the first gate line GLa of the i-th pixel row, and a second gate signal is applied to the second gate line GL thereof. When the first gate signal shifts from the gate-off voltage Voff to the gate-on voltage Von, the first and second switching elements Qa and Qb connected thereto are turned on. Accordingly, the data voltage Vd applied to the data line DL is applied to the first and second subpixel electrodes PEa and PEb through the turned-on first and second switching elements Qa and Qb. In this case, the data voltages Vd applied to the first and second sub-pixel electrodes PEa and PEb are identical to each other. The first and second liquid crystal capacitors Clca and Clcb are charged with the same value as a difference between the common voltage and the data voltage Vd.

Thereafter, when the first gate signal shifts from the gate-on voltage Von to the gate-off voltage Voff, and simultaneously the second gate signal shifts from the gate-off voltage Voff to the gate-on voltage Von, the first and second switching elements Qa and Qb are turned off, and the third switching element Qc is turned on. Thus, the charges are moved from the second sub-pixel electrode PEb to the first terminal of the step-up capacitor through the third switching element Qc. Meanwhile, the first subpixel electrode PEa connected to the second terminal of the step-up capacitor Cu is floated when the third thin film transistor Q3 is turned on. Accordingly, the changes are moved to the first terminal of the step-up capacitor Cu through the third switching element Qc such that the potential of the first subpixel electrode PEa may also be increased as the potential is increased. Accordingly, the charging voltage of the first liquid crystal capacitor Clca is increased.

Accordingly, the charged voltage of the first liquid crystal capacitor Clca is the same as the charged voltage of the second liquid crystal capacitor Clcb, and is different therefrom while the third thin film transistor Q3 is turned-on. In this way, the voltage of the first liquid crystal capacitor Clca is different from the voltage of the second liquid crystal capacitor Clcb such that the inclination angles of the liquid crystal molecules are different in the first subpixel and the second subpixel, and thereby the luminance of the two sub-pixels are different. Therefore, when the voltages of the first and second liquid crystal capacitors Clca and Clcb are appropriately adjusted, it is possible to make an image viewed from the side be as similar as possible to an image viewed from the front, and as a result it is possible to improve the side visibility.

Here, the capacitance magnitude of the step-up capacitor Cu for each pixel should be correctly maintained to uniformly maintain the voltage difference of the first subpixel PEa and the second subpixel PEb with the desired magnitude, thereby preventing the display deterioration such as texture. The capacitance magnitude C of the capacitor is proportional to the overlapping area of the two conductors, and is inversely proportional to the interval between the two conductors. The insulating layer disposed between the two conductors of the step-up capacitor Cu is simultaneously formed such that the thickness thereof is uniform. Accordingly, to uniformly maintain the capacitance magnitude of the step-up capacitor Cu, the overlapping area of the two conductors forming the step-up capacitor Cu should be uniformly maintained.

Next, the two conductors forming the step-up capacitor of a liquid crystal display according to the present exemplary embodiment will be described with reference to FIG. 3A to FIG. 3D. FIG. 3A to FIG. 3D are top plan views of two conductors of a step-up capacitor of a liquid crystal display according to an exemplary embodiment of the present invention.

Figure 3A:
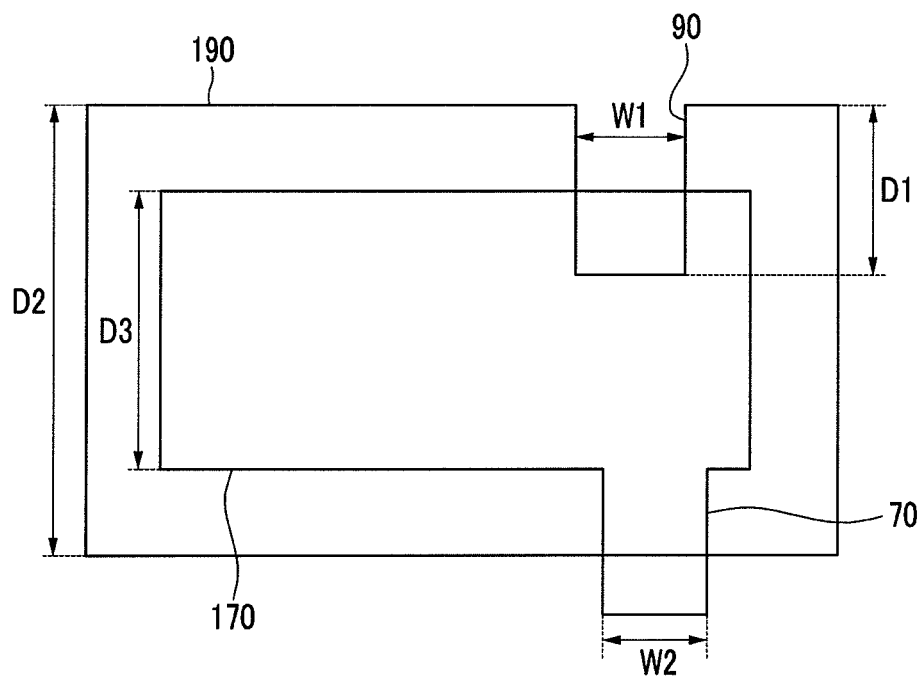
FIG. 3A to FIG. 3D are top plan views of two conductors of a step-up capacitor of a liquid crystal display according to an exemplary embodiment of the present invention.

Referring to FIG. 3A, the step-up capacitor Cu of the liquid crystal display is formed by overlapping a first conductor 170 and a second conductor 190. The first conductor 170 forming the first terminal of the step-up capacitor Cu is connected to the output terminal of the third switching element Qc, and the second conductor 190 forming the second terminal of the step-up capacitor Cu is connected to the pixel electrode of the first subpixel PEa.

The first conductor 170 has a connection 70 with the output terminal of the third switching element Qc, and the second conductor 190 has a cutout 90 formed in the edge opposite the connection 70 of the first conductor 170. The connection 70 of the first conductor 170 and the cutout 90 of the second conductor 190 have a square shape, the width W 1 of the cutout 90 of the second conductor 190 is the same as the width W 2 of the connection 70 of the first conductor 170, and the length D 1 of the cutout 90 is the same as the difference between the length D 2 of the second conductor 190 and the length D 3 of the first conductor 170 with respect to the direction of the length D 1 of the cutout 90. Here, the difference between the length D 2 of the second conductor 190 and the length D 3 of the first conductor 170 may be determined in the alignment error range of the first conductor 170 and the second conductor 190.

Figure 3B:
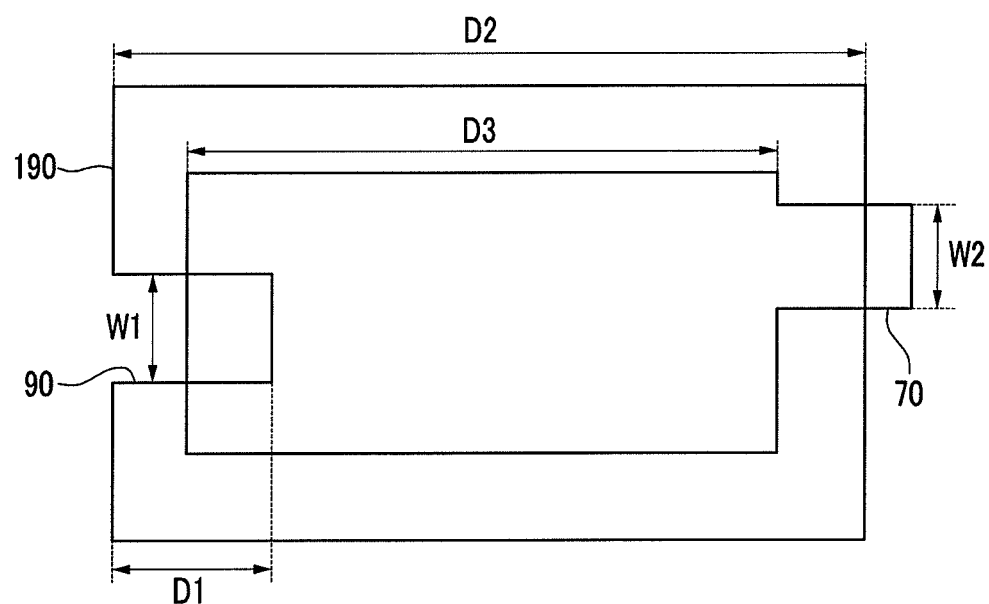

Referring to FIG. 3B, the first conductor 170 and the second conductor 190 forming the step-up capacitor Cu of a liquid crystal display shown in FIG. 3B is similar to the exemplary embodiment shown in FIG. 3A. However, the positions of the connection 70 of the first conductor 170 and the cutout 90 of the second conductor 190 forming the step-up capacitor Cu of a liquid crystal display shown in FIG. 3B are different from the positions of the connection 70 of the first conductor 170 and the cutout 90 of the second conductor 190 forming the step-up capacitor Cu of a liquid crystal display shown in FIG. 3A.

As shown in FIG. 3B, the step-up capacitor Cu is formed by overlapping the first conductor 170 and the second conductor 190, the first conductor 170 forming the first terminal of the step-up capacitor Cu has the connection 70 with the output terminal of the third switching element Qc, and the second conductor 190 forming the second terminal of the step-up capacitor Cu has the cutout 90 formed in the edge opposite the connection 70 of the first conductor 170. The connection 70 of the first conductor 170 and the cutout 90 of the second conductor 190 have a rectangular shape, the width W 1 of the cutout 90 of the second conductor 190 is the same as the width W 2 of the connection 70 of the first conductor 170, and the length D 1 of the cutout 90 is the same as the difference between the length D 2 of the second conductor 190 and the length D 3 of the first conductor 170.

Figure 3C:
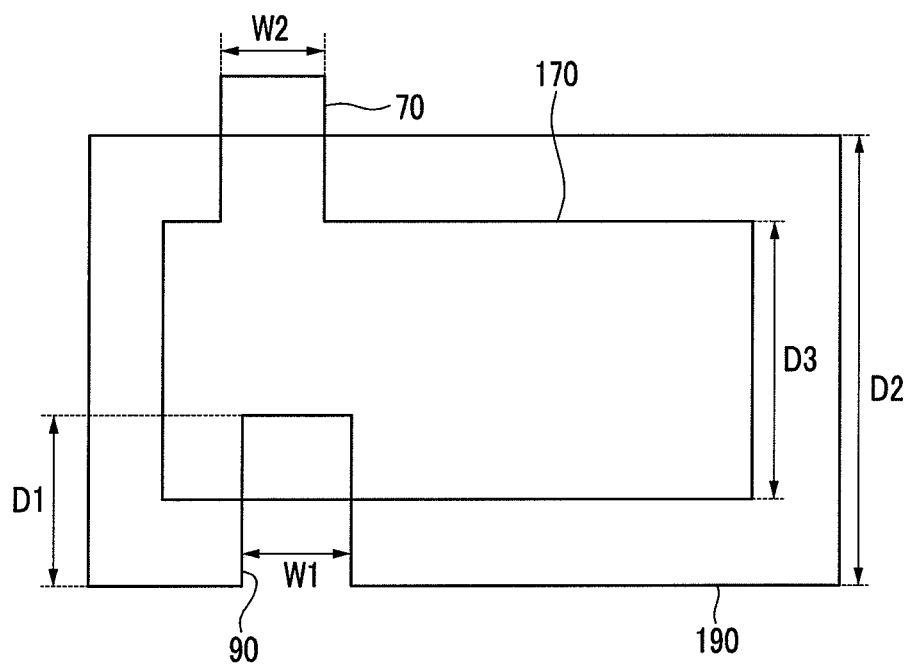
Figure 3D:
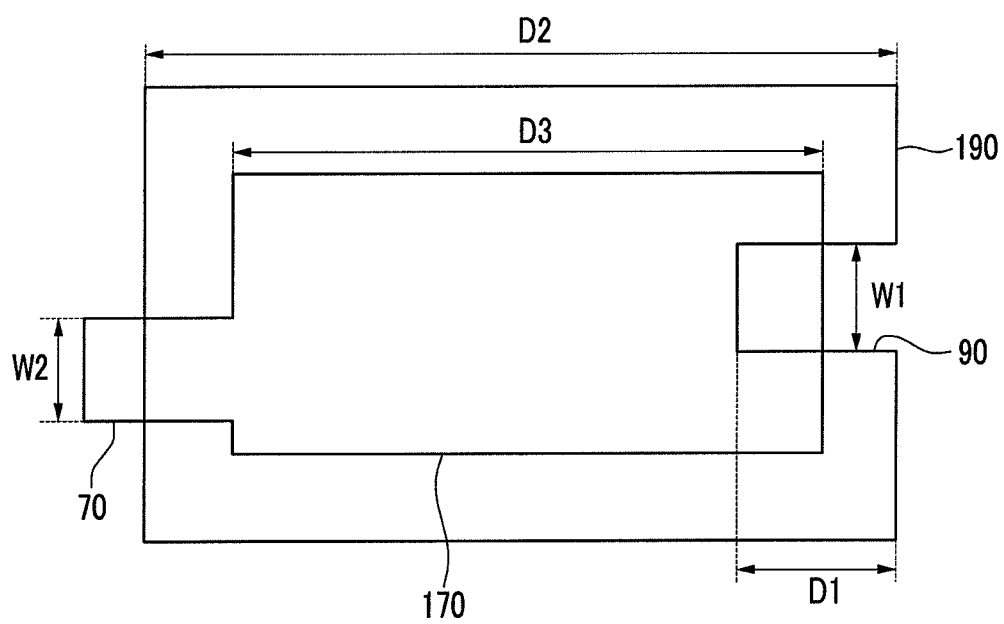

Referring to FIG. 3C and FIG. 3D, the first conductor 170 and the second conductor 190 forming the step-up capacitor Cu of a liquid crystal display shown in FIG. 3C and FIG. 3D is similar to the exemplary embodiment shown in 3A or FIG. 3B. However, the positions of the connection 70 of the first conductor 170 and the cutout 90 of the second conductor 190 forming the step-up capacitor Cu of a liquid crystal display shown in FIG. 3C and FIG. 3D are different from the positions of the connection 70 of the first conductor 170 and the cutout 90 of the second conductor 190 forming the step-up capacitor Cu of a liquid crystal display shown in FIG. 3A or FIG. 3B.

Figure 4:
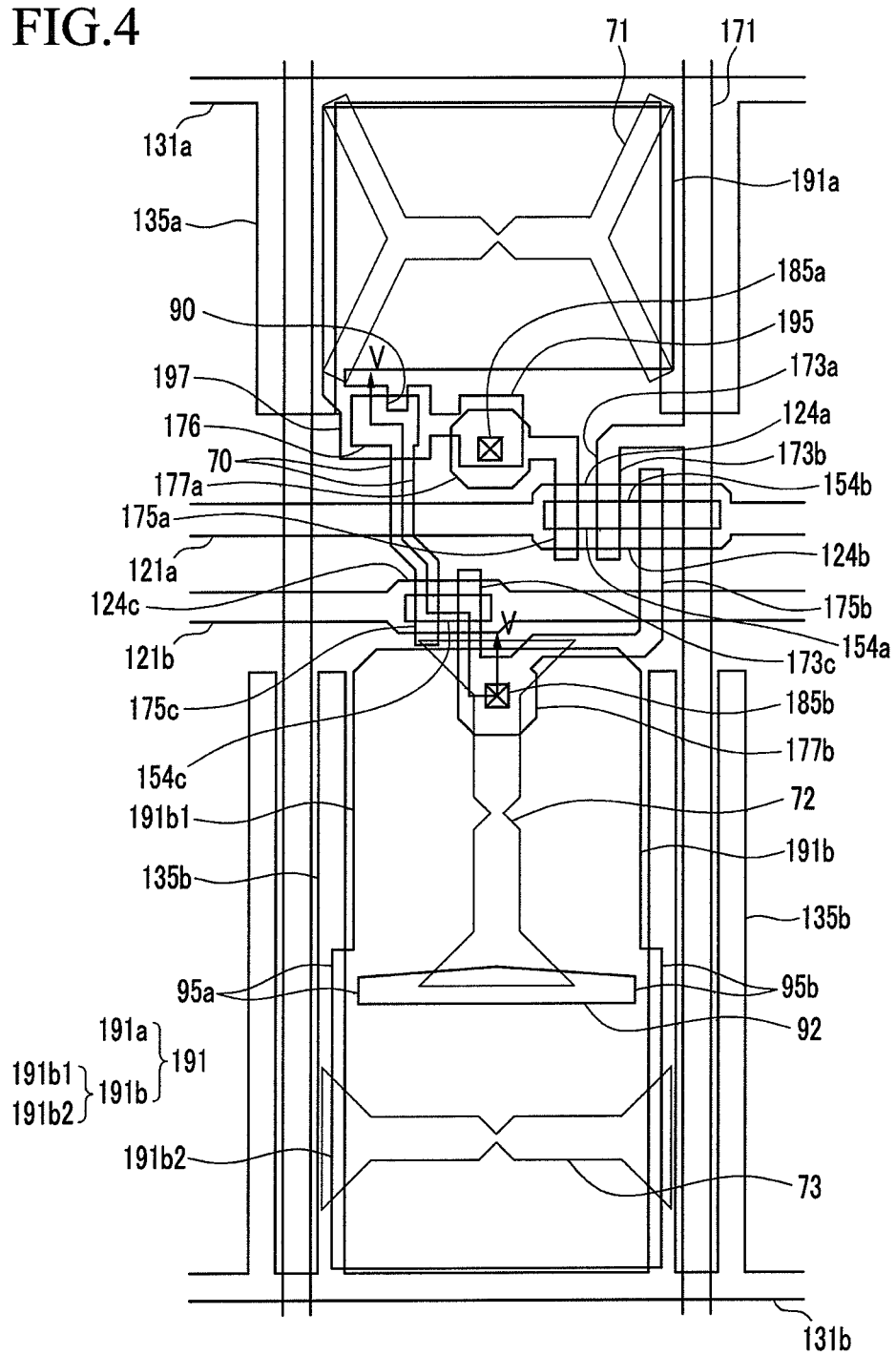
FIG. 4 is a layout view of a liquid crystal display according to an exemplary embodiment of the present invention.

As shown in FIG. 3C and FIG. 4, the step-up capacitor Cu is formed by overlapping the first conductor 170 and the second conductor 190, the first conductor 170 forming the first terminal of the step-up capacitor Cu has the connection 70 with the output terminal of the third switching element Qc, and the second conductor 190 forming the second terminal of the step-up capacitor Cu has the cutout 90 formed in the edge opposite the connection 70 of the first conductor 170. The connection 70 of the first conductor 170 and the cutout 90 of the second conductor 190 have a rectangular shape, the width W 1 of the cutout 90 of the second conductor 190 is the same as the width W 2 of the connection 70 of the first conductor 170, and the length D 1 of the cutout 90 is the same as the difference between the length D 2 of the second conductor 190 and the length D 3 of the first conductor 170.

Figure 5:
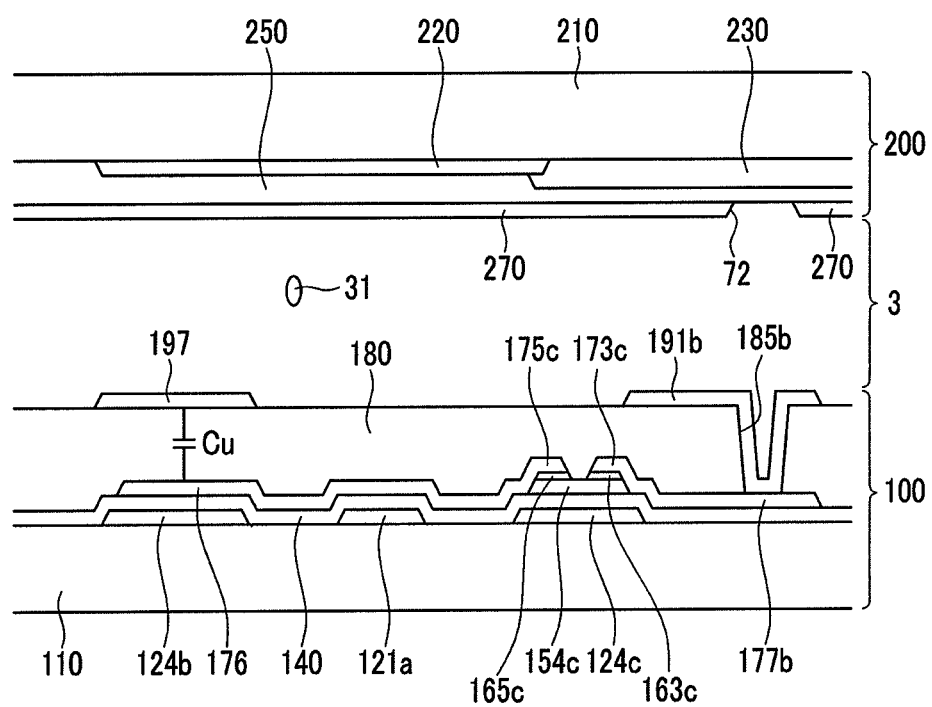
FIG. 5 is a cross-sectional view taken along the line V-V of FIG. 4.

Next, a liquid crystal display according to an exemplary embodiment of the present invention will be described with reference to FIG. 4 and FIG. 5. FIG. 4 is a layout view of a liquid crystal display according to an exemplary embodiment of the present invention, and FIG. 5 is a cross-sectional view taken along the line V-V of FIG. 4.

A liquid crystal display according to the present exemplary embodiment includes a lower panel 100 and an upper panel 200 facing each other, a liquid crystal layer 3 interposed between the two display panels 100 and 200, and a pair of polarizers attached at the outer surfaces of the display panels 100 and 200.

Now, the lower panel 100 will be described.

A plurality of gate conductors including a first gate line 121*a* and a second gate line 121*b* and first and second storage electrode lines 131*a* and 131*b* are formed on an insulation substrate 110 made of, for example, transparent glass or plastic. The first gate line 121*a* includes a first gate electrode 124*a*, a second gate electrode 124*b*, and an end having a wide area for connection with other layers or an external driving circuit, and the second gate line 121*b* includes a third gate electrode 124*c* and an end having a wide area for connection with other layers or an external driving circuit.

The storage electrode lines 131*a* and 131*b* transmit a predetermined voltage such as a common voltage, and include a plurality of storage electrodes 135*a* and 135*b*. The first storage electrode line 131*a* includes the first storage electrode 135*a*, and the second storage electrode line 131*b* includes the second storage electrode 135*b*. The first storage electrode 135*a* and the second storage electrode 135*b* are respectively extended parallel to the data line 171, and are separated from each other.

The first and second storage electrode lines 131*a* and 131*b* prevent light leakage upward and downward of the pixel, and the first and second storage electrodes 135*a* and 135*b* may prevent coupling between the pixel electrode 191 and the data line 171. Also, the storage electrode lines 131*a* and 131*b* are formed on and under the pixel area such that the large storage capacitance may be maintained, and may simultaneously prevent the light leakage upward and downward of the pixel area. A gate insulating layer 140 is formed on the gate conductors 121*a*, 121*b*, and 131.

A first semiconductor island 154*a*, a second semiconductor island 154*b*, and a third semiconductor island 154*c* are formed on the gate insulating layer 140.

Ohmic contacts 163*c* and 165*c* are formed on the first semiconductor island 154*a*, the second semiconductor island 154*b*, and the third semiconductor island 154*c*.

A data conductor includes a plurality of data lines 171 having first source electrodes 173*a*, second source electrodes 173*b*, first drain electrodes 175*a*, second drain electrodes 175*b*, third source electrodes 173*c* and third drain electrodes 175*c*, wherein the third drain electrodes 175*c* are formed on the ohmic contacts 163*c* and 165*c* and the gate insulating layer 140.

Each data line 171 includes an end having a wide area for connection with other layers or an external driving circuit.

The first and second drain electrodes 175*a* and 175*b* have wide end portions at one end thereof, and bar-shaped end portions at the other end thereof. The third drain electrode 175*c* includes a first capacitor electrode 176 extended from the third drain electrode 175*c*. The second drain electrode 175*b* and the third source electrode 173*c* are connected to each other.

The first gate electrode 124*a*, the first source electrode 173*a*, and the first drain electrode 175*a* form the first thin film transistor (TFT) Qa along with the first semiconductor island 154*a*, and the channel of the thin film transistor is formed in the semiconductor 154*a* between the source electrode 173*a* and the drain electrode 175*a*. Also, the second gate electrode 124*b*, the second source electrode 173*b*, and the second drain electrode 175*b* form the second thin film transistor Qb along with the second semiconductor island 154*b*, and the channel thereof is formed in the semiconductor 154*b* between the second source electrode 173*b* and the second drain electrode 175*b*, and the third gate electrode 124*c*, the third source electrode 173*c*, and the third drain electrode 175*c* form the third thin film transistor Qc along with the third semiconductor island 154*c*, and the channel is formed in the semiconductor 154*c* between the third source electrode 173*c* and the third drain electrode 175*c*.

A passivation layer 180 is formed on the data conductors 171, 173*c*, 175*a*, 175*b*, 175*c*, and 176, and on the exposed semiconductors 154*a*, 154*b*, and 154*c*. For example, the passivation layer 180 is made of an inorganic insulator such as silicon nitride and silicon oxide. However, the passivation layer 180 may be made of, for example, an organic insulator and may have a planarized surface. The organic insulator can have photosensitivity, and preferably, its dielectric constant is not greater than about 4.0. Also, the passivation layer 180 may have, for example, a dual-layered structure of a lower inorganic layer and an upper organic layer so that it may not harm the exposed portion of the exposed semiconductors 154*a*, 154*b*, and 154*c* while still sustaining the beneficial insulation characteristics of the organic layer.

The passivation layer 180 has a plurality of contact holes 185*a* and 185*b* respectively exposing wide ends 177*a* and 177*b* of the first and second drain electrodes 175*a* and 175*b*.

A pixel electrode 191 including a first subpixel electrode 191*a* and a second subpixel electrode 191*b* is formed on the passivation layer 180. The pixel electrode 191 may be made of a transparent conductive material such as, for example, indium tin oxide (ITO) or indium zinc oxide (IZO), or a reflective metal such as, for example, aluminum, silver, chromium, or alloys thereof.

The first subpixel electrode 191*a* and the second subpixel electrode 191*b* neighbor each other in a column direction, and are approximate quadrangles.

The first subpixel electrode 191*a* and the second subpixel electrode 191*b* are separated from each other, and the first gate line 121*a* and the second gate line 121*b*, and the first to third thin film transistors Qa, Qb, and Qc, are disposed in the gap between the first subpixel electrode 191*a* and the second subpixel electrode 191*b*. The two gate lines 121*a* and 121*b* and the thin film transistors are all disposed between the first subpixel electrode 191*a* and the second subpixel electrode 191*b* such that the area of the region occupied by the drain electrode may be reduced, thereby increasing the aperture ratio of the liquid crystal display.

The second subpixel electrode 191*b* may be divided into a first portion 191*b*1 and a second portion 191*b*2 disposed thereunder by a cutout pattern 92. The first portion 191*b*1 and the second portion 191*b*2 are connected by connections 95*a* and 95*b* on both sides.

The first subpixel electrode 191*a* includes a second capacitor electrode 197 extending toward the first capacitor electrode 176 and a extended portion 195 extended toward the wide end 177*a* of the first drain electrode 175*a*.

The first subpixel electrode 191*a* and the second subpixel electrode 191*b* are physically and electrically connected to the first drain electrode 175*a* and the second drain electrode 175*b* through the contacts holes 185*a* and 185*b*, thereby receiving the data voltage from the first drain electrode 175*a* and the second drain electrode 175*b*. The first/second subpixel electrodes 191*a*/191*b* applied with the data voltages generate an electric field along with the common electrode 270 of the common electrode panel 200 such that the orientation of the liquid crystal molecules of the liquid crystal layer 3 between the electrodes 191*a*/191*b* and 270 is determined. The polarization of light passing through the liquid crystal layer 3 is differentiated depending upon the determined alignment directions of the liquid crystal molecules 31. The first and second pixel electrodes 191*a* and 191*b* and the common electrode 270 form a liquid crystal capacitor to store voltages applied thereto even after the thin film transistor turns off.

Also, the first and second subpixel electrodes 191*a* and 191*b* overlap the storage electrode lines 131*a* and 131*b* and the storage electrodes 135*a* and 135*b* so as to form a storage capacitor, which reinforces the voltage storage capacity of the liquid crystal capacitors Clca and Clcb.

The first capacitor electrode 176 extended from the third drain electrode 175*c* and the second capacitor electrode 197 extended from the first subpixel electrode 191*a* overlap each other via the passivation layer 180 so as to form the step-up capacitor Cu.

The second capacitor electrode 197 has the cutout 90 at the edge facing the connection 70 between the third drain electrode 175*c* and the first capacitor electrode 176. The cutout 90 has a rectangular shape, the width of the cutout 90 is the same as the width of the connection 70 between the third drain electrode 175*c* and the first capacitor electrode 176, and the length of the cutout 90 is the same as the difference between the length of the first capacitor electrode 176 and the length of the second capacitor electrode 197.

Next, the upper panel 200 will be described.

A light blocking member 220 is formed on an insulation substrate 210 made of, for example, transparent glass or plastic. The light blocking member 220 is referred to as a black matrix, and prevents light leakage.

A plurality of color filters 230 are formed on the insulation substrate 210 and the light blocking member 220. The color filters 230 mostly exist within the area surrounded by the light blocking member 220, and may longitudinally extend along the columns of the pixel electrodes 191 in the longitudinal direction. The respective color filters 230 may express one of, for example, the three primary colors of red, green, and blue.

At least one of the light blocking member 220 and the color filter 230 may be formed on the lower substrate 110.

An overcoat 250 for preventing the color filters 230 from being exposed and for providing a flat surface is formed on the color filters 230 and the light blocking member 220. The overcoat 250 may be omitted.

A common electrode 270 is formed on the overcoat 250. For example, the common electrode 270 is preferably made of a transparent conductive material such as ITO and IZO, and has a plurality of sets of domain division means 71, 72, and 73.

The domain division means 71, 72, and 73 face one pixel electrode 191, and include a first domain division means 71, a second domain division means 72, and a third domain division means 73. The first domain division means 71 bisects the region of the first subpixel electrode 191*a* up and down, the second domain division mean 72 bisects the first portion 191*b*1 of the second subpixel electrode 191*b* up and down, and the third domain division mean 73 bisects the second portion 191*b*2 of the second subpixel electrode 191*b* left and right. The first domain division mean 71 has branches separated in both sides at both ends. Control of the area of the left and right domains is possible between the data line 171 and the first domain division means 71 by the branches. The ends of the second domain division means 73 and the third domain division means 73 are gradually expanded, thereby forming an isosceles triangle. The first domain division means 71, the second domain division means 72, and the third domain division means 73 are separated from each other. Triangle-shaped notches are formed at the central part of the domain division means 71, 72, and 73. The notches may have, for example, a quadrangular, trapezoidal, or semicircular shape, and may be convex or concave. These notches determine the arrangement direction of the liquid crystal molecules 31 disposed at the boundary of the region, divided by the domain division means 71, 72, and 73. The first domain division means 71, the second domain division means 73, and the third domain division means 73 may be, for example, a cutout or a protrusion.

The number and direction of the domain division means 71, 72, and 73 may be changed according to the elements of the design, and the shape and the arrangement thereof may be changed.

Alignment layers are formed on both surfaces of the display panels 100 and 200, and they may be vertical alignment layers.

Polarizers are formed on the outer surface of the display panels 100 and 200, the polarization axis of the two polarizers are crossed, and one polarization axis thereof may be parallel to the gate lines 121. In the case of a reflective liquid crystal display, one of the two polarizers may be omitted.

The liquid crystal layer 3 has negative dielectric anisotropy, and may be oriented such that the major axes of the liquid crystal molecules 31 of the liquid crystal layer 3 are almost perpendicular to the surfaces of the two display panels 100 and 200 when no electric field is applied.

Meanwhile, the gap between the two subpixel electrodes 191a and 191b of the pixel electrode 191, the cutout pattern 92 of the second subpixel electrode 191b, and the domain division means 71, 72, and 73 of the common electrode 270 deform the electric fields, and form horizontal components for determining the inclination direction of the liquid crystal molecules 31. The horizontal components of the electric field are perpendicular to the gap of the pixel electrode 191, the cutout pattern 92, and the domain division means 71, 72, and 73 of the common electrode 270.

Accordingly, inclined directions of the liquid crystal molecules 30 are all four directions, and four domains including the different alignment directions of the liquid crystal molecules 31 are formed in the liquid crystal layer 3. For example, four domains of a first domain, a second domain, a third domain, and a fourth domain are formed in the liquid crystal layer 3 corresponding to the first subpixel electrode 191a, and a fifth domain, a sixth domain, a seventh domain, and an eighth domain are formed in the liquid crystal layer 3 corresponding to the second subpixel electrode 191b. The viewing angle of the liquid crystal display may be widened by varying the inclined directions of the liquid crystal molecules. For example, the first domain and the second domain may be up and down domains, and the third domain and the fourth domain may be left and right domains. Also the fifth domain and the sixth domain may be up and down domains, and the seventh domain and the eighth domain may be left and right domains.

Figure 6:
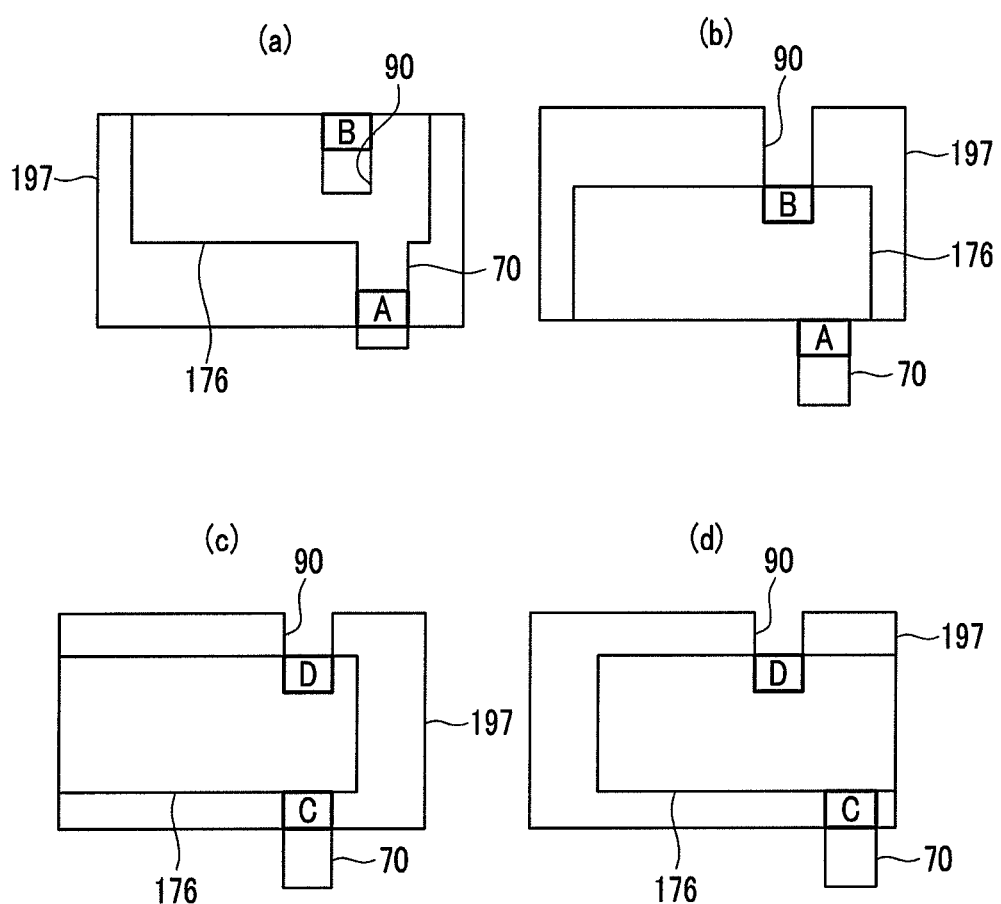
FIG. 6 is a top plan view of an arrangement of two conductors of a step-up capacitor of a liquid crystal display according to an exemplary embodiment.

Capacitance of a step-up capacitor Cu of a liquid crystal display according to an exemplary embodiment of the present invention will be described with reference to FIG. 6. FIG. 6 is a top plan view of an arrangement of two conductors forming a step-up capacitor of a liquid crystal display according to the present exemplary embodiment.

FIG. 6 (a) shows a case that the position of the first capacitor electrode 176 of the step-up capacitor Cu is misaligned in the upper side with respect to the second capacitor electrode 197, that is, the alignment error is generated in the upper side. Here, the connection 70 of the first capacitor electrode 176 and the second capacitor electrode 197 further overlap in the first portion A, however the portion of the first capacitor electrode 176 overlaps the cutout 90 of the second capacitor electrode 197 in the second portion B. The width and length of the first portion A is the same as the width and length of the second portion B such that the area of the first portion A is the same as the area of the second portion B. Accordingly, although the overlapping area of the connection 70 of the first capacitor electrode 176 and the second capacitor electrode 197 is increased by the alignment error, the total overlapping area of the first capacitor electrode 176 and the second capacitor electrode 197 is the same as the case that the alignment error is not generated, because of the cutout 90 of the second capacitor electrode 197. Accordingly, the capacitance magnitude of the step-up capacitor Cu may be uniformly maintained regardless of the alignment error.

FIG. 6 (b) shows a case that the position of the first capacitor electrode 176 of the step-up capacitor Cu is misaligned in the lower side with respect to the second capacitor electrode 197, that is, the alignment error is generated in the lower side. Here, the connection 70 of the first capacitor electrode 176 and the second capacitor electrode 197 overlap less in the first portion A, but however the portion of the first capacitor electrode 176 further overlaps the second capacitor electrode 197 in the second portion B. The width and length of the first portion A is the same as the width and length of the second portion B such that the area of the first portion A is the same as the area of the second portion B. Accordingly, although the overlapping area of the connection 70 of the first capacitor electrode 176 and the second capacitor electrode 197 is decreased by the alignment error, the total overlapping area of the first capacitor electrode 176 and the second capacitor electrode 197 is the same as the case that the alignment error is not generated. Accordingly, the capacitance magnitude of the step-up capacitor Cu may be uniformly maintained regardless of the alignment error.

FIG. 6 (c) and FIG. 6 (d) show cases that the position of the first capacitor electrode 176 of the step-up capacitor Cu is misaligned in the left and right sides with respect to the second capacitor electrode 197, that is, the alignment error is generated in the left and right sides. Here, the area of the portion C where the connection 70 of the first capacitor electrode 176 and the second capacitor electrode 197 overlap each other is canceled by the area of the portion D where the first capacitor electrode 176 and the cutout 90 of the second capacitor electrode 197 overlap each other such that the capacitance magnitude of the step-up capacitor Cu may be uniformly maintained regardless of the alignment error.

As described above, the second capacitor electrode 197 forming the step-up capacitor of the liquid crystal display according to an exemplary embodiment of the present invention has the cutout 90 at the edge opposite the connection 70 of the first capacitor electrode 176 and the output electrode of the third switching element Qc such that the step-up capacitor Cu having the uniform capacitance magnitude regardless of the alignment error between the first capacitor electrode 176 and the second capacitor electrode 197 may be formed. Accordingly, the unnecessary voltage deviation of the subpixel electrode according to the alignment error does not exist for each pixel such that the voltage difference of the subpixel electrodes may be uniformly maintained with the desired magnitude.

Next, a liquid crystal display according to another exemplary embodiment of the present invention will be described with reference to FIG. 7. FIG. 7 is a layout view of a liquid crystal display according to another exemplary embodiment of the present invention.

Referring to FIG. 7, a liquid crystal display according to the present exemplary embodiment is almost the same as the liquid crystal display according to the exemplary embodiment shown in FIG. 3 and FIG. 4. Detailed descriptions of like constituent elements are omitted.

However, the storage electrode lines 131a and 131b and the storage electrodes 135a and 135b of the liquid crystal display according to the present exemplary embodiment include an oblique portion 136 including a first oblique portion 136a and a second oblique portion 136b that form an angle of about 45 degrees along with the gate lines 121a and 121b. The first oblique portion 136a and the second oblique portion 136b form right angles and are alternately disposed, thereby forming a step shape. The edge of the oblique portion 136 is parallel to the polarization axis of the polarizer such that the edge of the pixel area is parallel to the polarization axis of the polarizer, and accordingly, the light leakage may be prevented at the edge of the pixel area and the texture that may be generated at the edge of the pixel area can be prevented.

Many characteristics of the liquid crystal display according to the previous exemplary embodiment may apply to the liquid crystal display according to the present exemplary embodiment.

As described above, the second capacitor electrode 197 forming the step-up capacitor of the liquid crystal display according to an exemplary embodiment of the present invention has the cutout 90 at the edge opposite the connection 70 of the first capacitor electrode 176 and the output electrode of the third switching element Qc such that step-up capacitor Cu having the uniform capacitance magnitude regardless of the alignment error between the first capacitor electrode 176 and the second capacitor electrode 197 may be formed. Accordingly, the unnecessary voltage deviation of the subpixel electrode according to the alignment error does not exist for each pixel such that the voltage difference of the subpixel electrodes may be uniformly maintained with the desired magnitude.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A liquid crystal display comprising:
a plurality of signal lines disposed on a substrate;
a pixel electrode connected to the plurality of signal lines and including a first subpixel electrode and a second subpixel electrode;
a common electrode facing the pixel electrode;
a liquid crystal layer disposed between the pixel electrode and the common electrode; and
a step-up capacitor connected between an output terminal of a switching element connected to the second subpixel electrode and the first subpixel electrode,
wherein the step-up capacitor is formed by overlapping a first conductor connected to the output terminal of the switching element and a second conductor connected to the first subpixel electrode via an insulating layer, and
the second conductor has a cutout at an edge opposite the output terminal of the switching element.

2. The liquid crystal display of claim 1, wherein
a width of the cutout of the second conductor is the same as a width of a connection between the first conductor and the output terminal of the switching element.

3. The liquid crystal display of claim 2, wherein
a length of the cutout of the second conductor is the same as a difference between a length of the first conductor and a length of the second conductor with respect to a length direction of the second conductor.

4. The liquid crystal display of claim 1, wherein
a length of the cutout of the second conductor is the same as a difference between a length of the first conductor and a length of the second conductor with respect to a length direction of the second conductor.

5. The liquid crystal display of claim 1, wherein
the common electrode has a domain division means.

6. The liquid crystal display of claim 1,
wherein the liquid crystal layer is divided into a first direction domain and a second direction domain in a region occupied by first subpixel electrode, and a third direction domain and a fourth direction domain in a region occupied by the second subpixel electrode.

7. The liquid crystal display of claim 6, wherein
the first direction domain is an up and down domain, and the second direction domain is a left and right domain.

8. The liquid crystal display of claim 7, wherein
the third direction domain is an up and down domain, and the fourth direction domain is a left and right domain.

9. The liquid crystal display of claim 1, wherein
the first subpixel electrode and the second subpixel electrode are separated from each other, and
the switching element connected to the second subpixel electrode is disposed between the first subpixel electrode and the second subpixel electrode.

10. The liquid crystal display of claim 9, wherein
the second subpixel electrode is divided into a first portion and a second portion, and the liquid crystal layer is divided into a first direction domain in a region occupied by the first portion of the second subpixel electrode and a second direction domain in a region occupied by the second portion of the second subpixel electrode.

11. The liquid crystal display of claim 1, wherein
a voltage charged between the first subpixel electrode and the common electrode is higher than a voltage charged between the second subpixel electrode and the common electrode.

12. The liquid crystal display of claim 1, further comprising
a storage electrode extended according to an edge of the first subpixel electrode and the second subpixel electrode.

13. A liquid crystal display comprising:
a lower display panel;
an upper display panel facing the lower panel and having a common electrode formed thereon; and
a liquid crystal layer disposed between the upper display panel and the lower display panel,
wherein the lower display panel includes
a plurality of gate conductors including a first gate line and a second gate line and a first storage electrode line and a second storage electrode line formed on an insulation substrate, wherein the first gate line includes a first gate electrode and a second gate electrode and the second gate line includes a third gate electrode, wherein the first storage electrode line includes a first storage electrode and the second storage electrode line includes a second storage electrode,
a gate insulating layer formed on the plurality of gate conductors;
a first semiconductor island, a second semiconductor island and a third semiconductor island formed on the gate insulating layer;
a plurality of ohnmic contacts formed on the first semiconductor island, the second semiconductor island and the third semiconductor island;

a data conductor includes a plurality of data lines having a first source electrode, a second source electrode, a first drain electrode, a second drain electrode, a third source electrode and a third drain electrode, wherein the third drain electrodes are formed on the ohmic contacts and the gate insulating layer and include a first capacitor electrode extended from the third drain electrode;

the first gate electrode, the first source electrode, and the first drain electrode form a first thin film transistor along with the first semiconductor island, the second gate electrode, the second source electrode, and the second drain electrode form a second thin film transistor along with the second semiconductor island, and the third gate electrode, the third source electrode, and the third drain electrode form a third thin film transistor along with the third semiconductor island, a passivation layer formed on the plurality of data conductors and on an exposed portion of the first semiconductor island, the second semiconductor island and the third semiconductor island, a pixel electrode including a first subpixel electrode and a second subpixel electrode formed on the passivation layer and wherein the first subpixel electrode includes a second capacitor electrode extending toward the first capacitor electrode and wherein the first subpixel electrode and the second subpixel electrode are physically and electrically connected to the first drain electrode and the second drain electrode;

a step-up capacitor which includes the first capacitor electrode extended from the third drain electrode and the second capacitor electrode extended from the first subpixel electrode overlapping with each other via the passivation layer, and wherein the second capacitor electrode has a cutout at an edge facing a connection between the third drain electrode and the first capacitor electrode.

14. The liquid crystal display of claim 13, wherein the cutout has a rectangular shape.

15. The liquid crystal display of claim 13, wherein a width of cutout is the same as a width of the connection between the third drain electrode and the first capacitor electrode.

16. The liquid crystal display of claim 13, wherein a length of the cutout is the same as a difference between a length of the first capacitor electrode and a length of the second capacitor electrode.

17. The liquid crystal display of claim 13, wherein the first subpixel electrode and the second subpixel electrode are separated from each other, and the first gate line and the second gate line, and the first thin film transistor, the second thin film transistor and the third thin film transistor are all disposed in a gap between the first subpixel electrode and the second subpixel electrode.

18. The liquid crystal display of claim 13, wherein the first subpixel electrode and the second subpixel electrode overlap the storage electrode lines and the storage electrodes to form a storage capacitor.

19. The liquid crystal display of claim 13, wherein the common electrode has a plurality of domain division means.

20. The liquid crystal display of claim 19, wherein the plurality of domain division means face the pixel electrode and include a first domain division means, a second domain division means and a third domain division means, wherein the first domain division means bisects a region of the first subpixel electrode up and down, the second domain division means bisects a first portion of the second subpixel electrode up and down and the third domain division means bisects a second portion of the second subpixel electrode left and right.

* * * * *